United States Patent Office 3,320,289
Patented May 16, 1967

3,320,289
16-FLUORO-ANDROSTENES AND ESTRENES CONTAINING A 17-UNSATURATED HALOGENATED HYDROCARBON SIDE CHAIN
John Fried, Plainfield, John Hannah, Strathmore-at-Matawan, and Arthur A. Patchett, Cranford, N.J., assignors to Merck & Co., Inc., Rahway, N.J., a corporation of New Jersey
No Drawing. Filed Mar. 19, 1964, Ser. No. 353,291
19 Claims. (Cl. 260—397.4)

This invention relates to 16-fluoro-androstenes and estrenes including B- ring unsaturated derivatives thereof substituted at the 17-position with an unsaturated halogenated hydrocarbon side chain containing up to three carbon atoms and to derivatives of these novel compounds. It relates also to methods for the preparation of the compounds and intermediates produced thereby. The compounds of this invention possess useful properties as orally and parenterally active progestational agents.

The final products within the scope of this invention may be represented by the formulas:

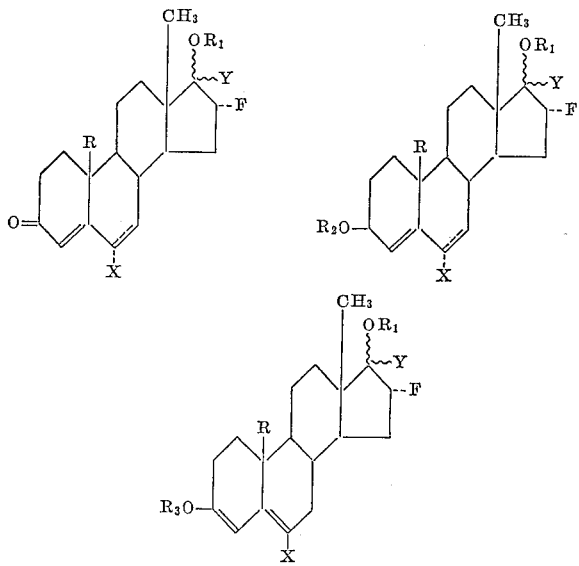

wherein R is hydrogen or methyl, $R_1$ and $R_2$ are hydrogen or acyl radicals, for example lower hydrocarbon carboxylic acid radicals such as benzoyl, acetyl, propionyl, butyryl, caprylyl or the like; and $R_3$ is hydrogen or an acyl radical preferably identical with $R_1$ or a hydrocarbon or substituted hydrocarbon substituent as for example an aliphatic or substituted aliphatic radical or alkyl or aralkyl more particularly a methyl, ethyl, butyl, amyl or benzyl radical; a cycloaliphatic or cycloalkyl grouping such as cyclopentyl, cyclohexyl or the like. Y is a halogenated alkenyl or alkynyl side chain containing from two to three carbon atoms such as trifluorovinyl, trifluoropropynyl or haloethynyl for example chloro- or bromoethynyl. X is hydrogen, fluorine or chlorine. The dotted line at the 16-position indicates that the fluorine atom is in the α-configuration and the dotted line between positions 6 and 7 indicate that a double bond may be present at this position. The dotted line to the X at the 6-position indicates two possible configurations. In the case of the 6,7-dihydro compound, X is in the α-configuration and in the 6,7-dehydro compound, it is in the fixed position characteristic of a substituent attached to a number 6 carbon atom of a steroid nucleus which is doubly bonded to a number 7 carbon atom.

It will be noted that in the above formulas a wavy line is used to indicate the attachment of both substituents at the number 17 carbon atom. The wavy line as is customary, indicates that these substituents may be in either the α- or β-configuration. The compounds of this invention possess progestational activity irrespective of the configuration of the substituents of the 17-position. This is a most unusual and unexpected discovery since in related compounds such as norethisterone progestational activity is found only in those compounds in which the carbon atom side chain is in the α- configuration.

In the presently preferred method for the preparation of the valuable compounds of this invention, 16α-fluoro-3β-hydroxy-androst-5-en-17-one or the corresponding estr-4-ene are utilized as starting compounds. The selection of a particular starting compound depends, of course, on whether the final product is to be an androstene or estrene.

The starting compounds are prepared by reaction of 3β-acetoxy-17-acetamino-androsta-5,16-diene or the corresponding estradiene with perchloryl fluoride followed by dilute mineral acid. The steroid is conveniently prepared by the Beckmann rearrangement of the oxime of the appropriately substituted 20-keto-$\Delta^{16}$-steroid. Removal of the 3-acetyl group, for example, by acid catalyzed hydrolysis in methanol yields the desired products.

Reaction of the starting compound with a haloethyne forms an isomeric mixture of the corresponding 17-haloethyne compounds which may be separated for example by fractional crystallization or chromatography. The compounds may be represented by the formula:

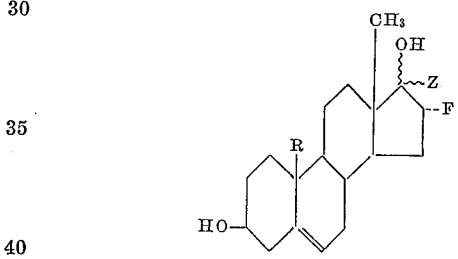

wherein R has the same meaning as above and Z is a haloethyne radical.

In a preferred embodiment of this procedure, the haloethyne is formed in situ by reaction of 1,2-dichloroethylene (preferably in the cis form), with methyl lithium in an inert organic solvent. For example, a mixture of the 17α- and β-isomers of 16α-fluoro-17-chloroethynyl-estr-5-ene-3β,17-diol is prepared by adding a solution of cis-1,2-dichloroethylene in ether to an ethereal solution of methyl lithium at about 0° C., stirring the mixture under nitrogen for about one hour, adding an ethereal solution of the steroid and stirring for an additional several hours. The use of an inert atmosphere is not essential but helps to minimize side reactions.

A trifluoropropynyl substituent is introduced at the 17-position by reaction of the corresponding 17-oxo compound with trifluoropropyne previously treated with ethyl magnesium bromide. For example, a mixture of the 17α and β isomer of 16α-fluoro-17-trifluoropropynyl-androst-5-ene-3β,17-diol is prepared by reaction between the 17-oxo compound and the reaction product of trifluoropropyne and ethyl magnesium bromide in an inert organic solvent.

A trifluorovinyl substituent is introduced by reaction of a 17-oxo-steroid with trifluorovinyl magnesium bromide. For example, a mixture of 17α and β-isomers of 16α - fluoro - 17 - trifluorovinyl - androst - 5 - ene - 3β, 17-diol may be prepared by reaction of 16α-fluoro-3β-hydroxy-androst-5-en-17-one with trifluorovinyl magnesium bromide in an inert organic solvent at ambient temperature.

As aforesaid, the 17-isomers may be separated by crystallization or chromatography. Each isomer may be treated as described hereinafter to prepare other compounds of this invention. For ease of understanding, the reactions will be described by reference to 17α-chloroethynyl androstene compounds but it should be understood that the reactions are equally applicable to the preparation of 17β-chloroethynyl androstenes and to androstenes and estrenes with the same or another 17-halogenated alkenyl or alkynyl side chain whether in the α- or β-configuration. Separation of isomers may be effected at another stage in the synthesis or may be completely omitted if desired, since mixtures of the progestationally active isomers of the invention are useful.

Preferred compounds within the scope of this invention are 6α,16α-difluoro compounds and their preparation will now be described as applied to 17α-chloroethynyl androstenes.

In the first step of the synthesis, the 3β-hydroxyl group of the chloroethynyl compound is oxidized to form a 3-keto-$\Delta^5$-compound. Oxidation may be effected by any number of procedures including oxidation with the pyridine-chromium trioxide complex or the Oppenauer oxidation. In a preferred method, the oxidation is effected using the Jones reagent which is a solution of chromic acid in sulfuric acid. The reaction is carried out by adding the reagent to an inert organic solvent solution of the steroid at from about 15° C. to about 30° C. and stirring for approximately 10 to 60 minutes. Side reactions are minimized by the use of an inert atmosphere although this is not essential.

The Jones reagent is well known for the oxidation of alcohols to ketones and is usually prepared as an 8 N solution by dissolving 26.7 grams of chromium trioxide in 23 cc. of concentrated sulfuric acid and diluting to 100 cc. with water. With the reagent prepared in this manner, 250 cc. of reagent will theoretically form one mole of ketone from one mole of alcohol.

With the Jones reagent, the reaction product is a mixture of the 3-keto-$\Delta^4$- and the 3-keto-$\Delta^5$-compounds, the former being produced by rearrangement of the $\Delta^5$ compound under the acid conditions of the reaction. If it is desired to obtain a substantially pure 3-keto-$\Delta^5$-compound, it is best to utilize the Oppenauer conditions or the pyridine-chromium trioxide complex since rearrangement is minimized by the use of alkaline reagents. Generally, the Jones reagent is preferred for simplicity of operation and high yields. The mixture obtained is treated with acid to rearrange substantially all of the $\Delta^5$ compound to the $\Delta^4$ compound which is used in the synthesis.

Isomerization of the double bond at the 5-position is accomplished by treatment of the $\Delta^5$-compound with inorganic or organic acid. For example, the mixture may be taken up in acetic acid containing 2% by volume of sulfuric acid and maintained at 25° C. to 30° C. for four to five hours. In a preferred procedure, the steroid mixture is taken up in an inert organic solvent such as acetone containing a small amount of organic acid such as p-toluene-sulfonic acid and heated at approximately 50° C. to 100° C. for from about one-half to one hour.

The products produced by the above reactions are progestationally active and may be generally represented by the formula:

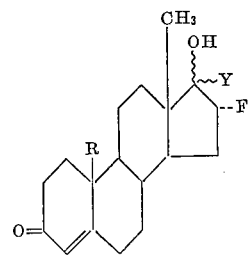

wherein R and Y have the same meaning as above.

In the next step of the synthesis of the preferred 6α,16α-difluoro compounds of this invention, the 3-keto compound is converted to an enol ether preferably an ethoxy ether although other ethers are useful. In a preferred procedure, the novel 3-enol ethers are prepared by adding an alkyl orthoformate, a cycloalkyl orthoformate or aralkyl orthoformate such as ethyl orthoformate, propyl orthorformate, n-butyl orthoformate, cyclopentyl orthoformate, cyclohexyl orthoformate, benzyl orthoformate and the like and an acid catalyst such as 2,4-dinitrobenzenesulfonic acid, p-toluene-sulfonic acid and the like to a solution of the steroid in a reaction inert organic solvent such as dioxane or preferably the alcohol corresponding to the particular orthoformate employed, and stirring the resulting mixture at room temperature. The acid catalyst is then neutralized with a base such as pyridine and the desired product recovered from the neutralized reaction mixture.

It is also convenient to prepare 3-enol ethers other than the ethyl ethers by transetherification of the ethyl ether with the appropriate alcohol under acid catalysis. The 3-enol ether is taken up in an inert hydrocarbon solvent such as isooctane containing an alcohol for example an aliphatic alcohol such as propanol, n-butanol, amyl alcohol; a cycloaliphatic alcohol for example a cycloalkanol such as cyclohexanol or cyclopentanol; an araliphatic alcohol as for example an aralkanol such as benzyl alcohol and the like together with an acid catalyst such as p-toluenesulfonic acid and the resulting mixture heated preferably under reflux in an apparatus equipped with means for removing the water from the distillate and returning the dry distillate to the reaction mixture. The acid catalyst is then neutralized with a base such as pyridine and the desired product recovered.

A fluorine atom is next substituted at the 6β-position while at the same time, the enol ether is converted to a 3-keto-$\Delta^4$ compound by the action of perchloryl fluoride. This reaction may be carried out by bubbling perchloryl fluoride gas into a solution of the steroid in an inert organic solvent in the presence of a base at a temperature of from about 0° C. to about 25° C. Preferably the reaction is carried out in pyridine which functions both as solvent and as base. An excess of perchloryl fluoride is preferably used to effect as complete a reaction of the steroid as possible. The use of an inert atmosphere helps to minimize side reactions.

The 6β-fluoro atom is epimerized to the α-configuration by treatment with acid in an inert organic solvent. In a preferred procedure, the steroid is taken up in a halogenated aliphatic solvent such as chloroform which has been saturated with dry hydrogen chloride. The solution is preferably protected from the atmosphere and allowed to stand at ambient temperature for about 15 to 20 hours.

The following reaction sequence illustrates the above described reactions as applied to the preparation of 6α,16α - difluoro-17α-chloroethynyl-17β-hydroxy-androst-4-en-3-one:

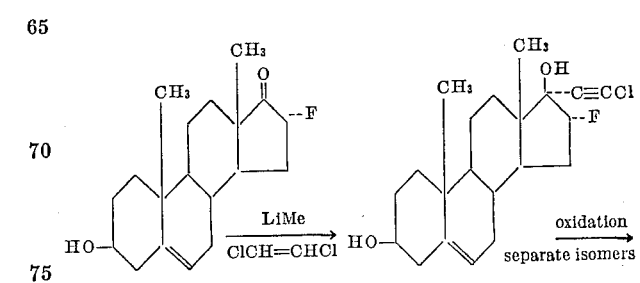

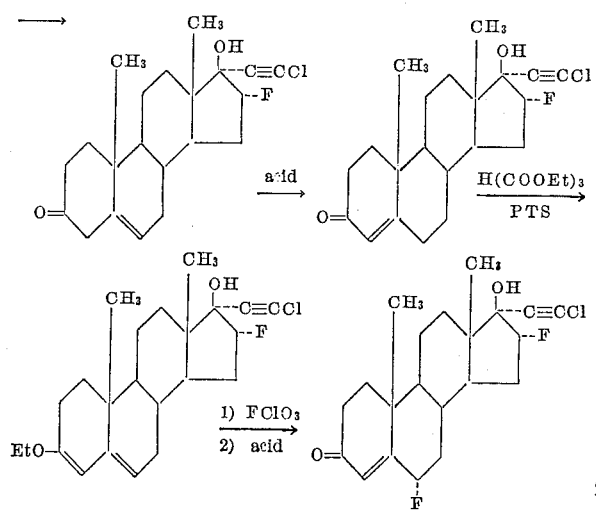

The 6α-chloro-3-keto-Δ⁴-compounds within the scope of this invention may be prepared by the following sequence of reactions from an enol ether prepared as described above. The reaction sequence is shown starting with ethyl ether, but others may be equally well utilized.

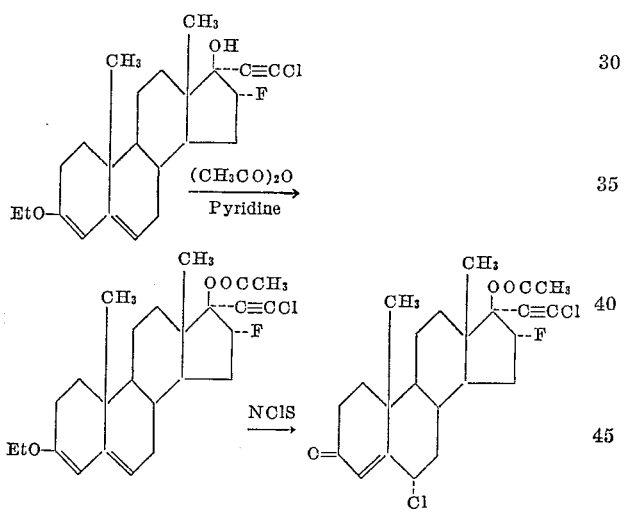

In the first step of this sequence, the enol ether is acylated at the 17-position. Although usually an acetate is formed, other alkanoyl esters may be similarly prepared and utilized. Typically, the ester is prepared by reaction between a lower alkanoyl anhydride in the presence of a tertiary amine preferably pyridine. The anhydrides which are ordinarily used include acetic, propionic, butyric and similar anhydrides.

The chlorine atom is substituted in the 6-position by reaction of the steroid with N-chlorosuccinimide. Preferably the reaction takes place under acid conditions so as to produce a 6α-chloro compound. In a preferred application of the reaction, the enol ether is taken up in glacial acetic acid and the mixture cooled to from about 10° C. to 20° C. and at least a molar equivalent of the N-chlorosuccinimide is added together with a solution of hydrogen chloride in an ether solvent such as tetrahydrofuran or dioxane. The reaction mixture is then stirred at approximately —5° C. to 10° C. for about one to three hours. If non-acid conditions are used the intermediate 6β-chloro compound can be isomerized with acid as described for the 6β-fluoro compound.

The 17-acylates thus prepared may be hydrolyzed to form 17-ols by hydrolysis for example catalytic hydrolysis using dilute aqueous potassium carbonate in methanol.

Enol ethers of the 6-chloro and 6-fluoro compounds prepared in accordance with the foregoing procedures may be formed by the reactions described above.

The 6-chloro-Δ⁶-compounds within the scope of this invention may be prepared by the following sequence of reactions which illustrates the preparation of 6-chloro-16α-fluoro-17α-chloroethynyl - 17 - acetoxy-androsta-4,6-dien-3-one. The enol ether starting compound is prepared as described above.

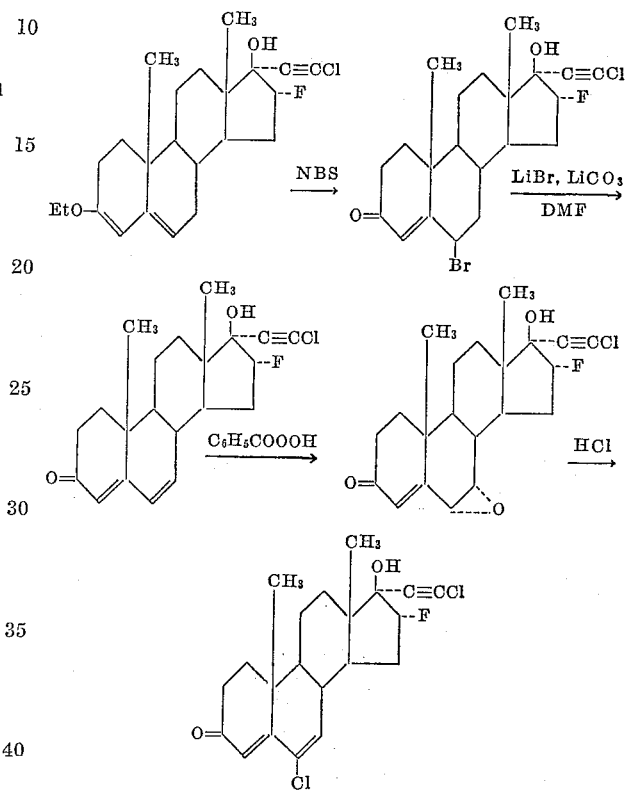

Reaction of an enol ether, illustrated above as the ethyl ether, with N-bromosuccinimide, substitutes the bromine atom at the 6β-position and at the same time converts the enol ether to a 3-keto-Δ⁴-compound. In a preferred procedure, a solution of the steroid and sodium acetate in aqueous acetone is stirred with the N-bromosuccinimide and acetic acid at from about —5° C. to about 5° C.

The 6-bromo compound is then dehydrobrominated to produce a Δ⁶-compound. Dehydrobromination is conveniently effected by heating the solution of the steroid in an inert organic solvent such as dimethylformamide with lithium bromide and lithium carbonate for several hours at about 100° to 130° C.

The Δ⁶ compound is then oxidized to the 6α,7α-epoxy compound by treatment with a peracid such as perbenzoic acid in an inert solvent such as benzene in the dark at room temperature for from 60 to 70 hours.

A solution of the epoxy steroid in an inert organic solvent such as chloroform is treated with hydrogen chloride at room temperature to produce the 6-chloro-Δ⁶-compound.

It is also possible to produce Δ⁶-compounds of this invention, for example 6-fluoro, 6-chloro or 6-dehalo compounds by dehydrogenation of the appropriate 3-keto-Δ⁴-compound with a 6,7-dihydrogenating quinone such as chloroanil. Reaction is generally effected by heating the steroid under reflux with the quinone with an inert organic solvent such as an ester or an alcohol. The presence of a small amount of lower alkanoic acid such as acetic acid often aids the reaction. The use of an inert atmosphere aids in minimizing side reactions but is not essential. For example, 6,17α - difluoro-17α-chloroethynyl-17-acetoxy-androsta-4,6-dien-3-one can be prepared by refluxing the corresponding 6-fluoro-3-keto-$\Delta^4$ compound in n-butanol with chloronil for from two to five hours.

This invention includes within its scope in addition to the 3-keto compounds and their enol ethers both as free 17-ols and acylates whose preparation is described above, the enol acylates of the 3-keto-$\Delta^4$ compounds and also the 3-acylates which may be formed by acylation of the 3$\beta$-ols obtained by stereospecific reduction of the 3-keto steroids.

Two basic reactions are utilized to prepare these products of the invention. They are acylation and reduction. The structure of the final product is determined by the order in which the reactions are carried out.

Direct acylation of, for example 6$\alpha$,16$\alpha$-difloro-17$\alpha$-chloroethynyl-17$\beta$-hydroxy-androst-4-en-3-one affords a mixture of a 17-acetate and the enol acetate of the 3-oxo compound, i.e. 17$\beta$-acetoxy - 6$\alpha$,16$\alpha$-difluoro-17$\alpha$-chloroethynyl-androst-4-en-3-one and 3,17$\beta$-diacetoxy-6,16$\alpha$-difluoro-17$\alpha$ - chloroethynyl - androsta-3,5-diene. The mixture may be separated chromatographically.

Reduction of the 3-keto group is effected with a stereospecific reducing agent such as lithium aluminum hydride tri-tertiary butoxide. For example, 6,16$\alpha$-difluoro-17$\alpha$-chloroethynyl-androsta-4,6-diene-3$\beta$,17$\beta$-diol may be produced by allowing a mixture of the steroid and the reducing agent in tetrahydrofuran to stand for approximately one hour at room temperature. In a preferred modification, the reaction mixture is initially maintained at approximately 0° C. for about 15 minutes and then at room temperature for about one hour. The use of an initial low temperature period is not essential, however.

By appropriate selection of the order of reaction, either 3$\beta$ or 17$\beta$-monoacylates or if desired, either symmetrical or nonsymmetrical diacylates may be produced. The preferred procedure for the preparation of diesters is to first acylate the 3-oxo compound, separate the 17-ester thus formed from the enol diacylate which is coproduced, reduce the keto group and finally acylate the reduction product. This procedure produces higher yields of purer product than the alternative procedure. The 3-monoacetate is produced by preferential acylation of the 3$\beta$, 17-diol.

It will be noted that the enol esters are symmetrical diesters and that they can be obtained only from 6,7-dihydro compounds. Stereospecific reduction, however, is not so limited and, therefore, 3$\beta$-acyloxy-$\Delta^{4,6}$-compounds within the scope of this invention may be readily prepared.

The alkanoyl esters are prepared by reaction of the selected steroid with the acylating agent for example, an alkanoic acid anhydride or alkanoyl halide in the presence of a tertiary amine such as pyridine. Esterification at the 3$\beta$-position can be accomplished more easily than esterification at the 17-position. Generally, 3-acylation is effected simply by allowing the reactants to stand at room temperature for several hours or by heating on a steam bath for 10 to 30 minutes. Esterification at the 17-position is best effected by allowing the reaction mixture to stand on a steam bath for at least five hours. Symmetrical diesters are prepared by acylating the 3$\beta$-hydroxy group with the acylating agent initially employed in the preparation of the 3-oxo-17-acylate. Nonsymmetrical esters are prepared by acylation of the 3$\beta$-hydroxy group with a different esterification agent.

An alternative method may be used for the preparation of the 6-dehalo compounds of this invention utilizing 17$\beta$-hydroxy-androst-4-en-3-one (testosterone) or the corresponding 19-nor compound, 17$\beta$-hydroxy-estr-4-en-3-one (19-nortestosterone) as the starting compound.

In accordance with this procedure, the 3-oxo group is initially blocked to permit oxidation of the 17-hydroxyl group. Several blocking groups which may be regenerated by simple hydrolysis are available for example, enol ethers, semicarbazides or various ketals including thioketals. The preferred blocking group is the ethylenedioxy group which may be substituted by reaction of the steroid with ethylene glycol under substantially anhydrous condition in an inert organic solvent such as ethylene dichloride or benzene, in the presence of an acid catalyst preferably an organic acid such as p-toluenesulfonic acid which may be utilized in the hydrate form. If desired, the solvent may be omitted and excess ethylene glycol utilized as the solvent.

When this reaction is carried out with 17$\beta$-hydroxy-estr-4-en-3-one, a mixture of $\Delta^{5,6}$- and $\Delta^{5,10}$-isomers is obtained and these may be separated e.g. by chromatography.

The 17$\beta$-hydroxyl group is next oxidized by any convenient procedure. Preferable oxidation methods include the use of the pyridine-chromium trioxide complex or oxidation under Oppenauer conditions.

The oxalyl group is then substituted at the 16-position in the presence of an alkaline reagent. For example, the steroid is reacted with a lower alkyl oxalic acid diester in an inert organic solvent in the presence of alkali metal alkanoate to produce the alkali metal enolate. It is convenient to take up the steroid in an inert lower alkanol solvent such as t-butanol and to add at least a molar equivalent of a base such as sodium ethylate and an ester such as diethyl oxalate and to allow the mixture to stand preferably in an inert atmosphere with or without stirring for from about four to eight hours. Generally, the steroid dissolves in a relatively short time and the product starts to precipitate shortly thereafter.

The oxalyl group is then replaced with a fluorine atom. This is accomplished by first reacting the oxalyl substituted steroid with perchloryl fluorine to produce a 16$\alpha$-fluoro-16$\beta$-alkoxalyl compound which is then treated with an alkaline reagent to remove the alkoxalyl group. For example, the fluorinated compound may be taken up in a lower alkanol solvent containing a small amount of base such as alkali metal alkanoate specifically sodium methylate or sodium ethylate and the mixture allowed to stand at room temperature for from about one to six hours. During this period, the alkoxalyl group is removed and the desired product may be recovered. There is thus obtained a mixture of 16$\alpha$- and 16$\beta$-fluorinated steroids which may be separated chromatographically.

The 16$\beta$-fluoro steroid may be isomerized to the 16$\alpha$-compound by treatment with base. For example, the steroid may be taken up in a lower alkanol solvent such as methanol or ethanol containing 0.1 equivalent of an alkali metal alkanoate such as sodium methoxide or ethoxide per equivalent of steroid and the mixture refluxed for from one-half to 2 hours to form the desired 16$\alpha$-compound.

The 16-fluorinated steroids obtained by the foregoing series of reactions may be then converted to 17-hydroxy-17-halogenated alkenyl or alkynyl substituted steroids such as 17-hydroxy-17-chloroethynyl steroids by the reactions described above. The isomeric mixtures so obtained may be separated chromatographically.

In the final step of the alternative procedure, the blocking group at the 3-position is removed by hydrolysis. An ethylenedioxy group, for example, may be removed by acid hydrolysis with hydrochloric acid in an aqueous lower alkanol preferably methanol.

The compounds of this invention are progestational agents and are useful in the treatment of various human ailments requiring progestational hormone therapy. They may be administered alone or associated with a pharmaceutical carrier, the choice of which will depend upon the properties of the active compound and standard pharmaceutical practice. Generally, the compound is administered in dosages of the same order of magnitude as other progestational agents such as norethisterone and dosage units may take the form of tablets, powders, capsules, elixirs or syrups which are particularly useful for oral ingestion. Liquid diluents are employed in sterile condition for parenteral use.

The following examples are given by way of illustration only and are not intended as limitations of this invention, many apparent variations of which are possible without departing from the spirit and scope thereof.

*Example 1.—16α-fluoro-17α-chloroethynyl-androst-5-ene-3β,17β-diol and 16α-fluoro-17β-chloroethynyl-androst-5-ene-3β,17α-diol*

A solution of 54.2 grams of cis,1,2-dichloroethylene in 50 ml. of anhydrous ether is added over approximately ten minutes to a stirred etheral solution (anhydrous) of 1.3 molar lithium methyl in an ice bath under nitrogen. The ice bath is removed and stirring continued at room temperature for 15 minutes. There is then added 7.13 grams of 16α-fluoro-3β-hydroxy-androst-5-en-17-one in 620 ml. of anhydrous ether over a period of 20 minutes and stirring is continued for an additional hour. To this mixture 500 ml. of ether is added and the reaction mixture washed four times with 200 ml. portions of water. The organic layer is separated, dried over anhydrous magnesium sulfate, filtered and evaporated to a volume of about 50 ml. The 17β-chloroethynyl isomer crystallizes spontaneously in substantially pure form and is recrystallized from methanol. A second crop of mixed isomers precipitates and is recrystallized from ether to provide additional 17β-chloroethynyl compound. The 17α-chloroethynyl compound is obtained from the combined ethereal filtrates by the addition of methylene chloride and hot cyclohexane. Evaporation of most of the methylene chloride causes spontaneous crystallization of the desired isomer.

This procedure is utilized to prepare the following compounds which are separated by fractional crystallization or chromatography over basic alumina:

16α-fluoro-17α-chloroethynyl-estr-5-ene-3β,17β-diol;
16α-fluoro-17β-chloroethynyl-estra-5-ene-3β,17α-diol.

The corresponding 17-bromoethynyl compounds are similarly prepared from the same starting compounds utilizing 1,2-dibromoethylene in place of 1,2-dichloroethylene.

*Example 2.—16α-fluoro-17α-trifluorovinyl-androst-5-ene-3β,17β-diol and 16α-fluoro-17β-trifluorovinyl-androst-5-ene-3β,17α-diol*

A solution of 1 gram of 16α-fluoro-3β-hydroxy-androst-5-en-17-one in 10 ml. of benzene containing an equal amount of ether is prepared by adding the steroid to 15 ml. of benzene, distilling off 5 ml. of solvent, cooling and adding the ether. To this mixture is added 10 ml. of a tetrahydrofuran solution containing 0.1 mole of trifluorovinyl magnesium bromide and the mixture is stirred for approximately 16 hours at 20° C. to 30° C. It is then diluted with water and extracted with ether. The combined extracts are washed with water until the washings are weakly basic, dried over anhydrous sodium sulfate, filtered and the solvent removed. The residue is chromatographed on basic alumina with petroleum ether-ether solvents to separate the desired isomers.

This procedure is also utilized to prepare 16α-fluoro-17α-trifluorovinyl-estr-5-ene-3β,17β-diol and 16α-fluoro-17β-trifluorovinyl-estr-5-ene-3β,17α-diol.

*Example 3.—16α-fluoro-17α-trifluoropropynyl-androst-5-ene-3β,17β-diol and 16α-fluoro-17β-trifluoropropynyl-androst-5-ene-3β,17α-diol*

To 210 mg. of dried magnesium in 5 ml. of anhydrous ether is added 1 ml. of ethyl bromide in 5 ml. of ether with stirring over a period of 15 minutes. After all the magnesium has reacted, 5 ml. of trifluoropropyne (prepared by the reaction of propiolic acid with sulfur tetrafluoride) is added by distillation and the mixture refluxed for one hour. The reaction is then allowed to warm to room temperature, the excess trifluoropropyne being distilled off. A solution of 500 mg. of 16α-fluoro-3β-hydroxy-androst-5-en-17-one in 10 ml. of a 1:1 mixture of benzene and ether which has been dried by azeotropic distillation is added and the mixture stirred for 16 hours at room temperature. Water is then added and the mixture extracted with ether. The organic extracts are washed with water until the washings are weakly basic, dried over sodium sulfate and concentrated in vacuo. The residue is chromatographed on basic alumina using petroleum ether-ether solvents to separate the desired isomers.

The following compounds are similarly prepared from the appropriate starting material:

16α-fluoro-17α-trifluoropropynyl-estr-5-ene-3β,17β-diol;
16α-fluoro-17β-trifluoropropynyl-estr-5-ene-3β,17α-diol.

*Example 4.—16α-fluoro-17α-chloroethynyl-17β-hydroxy-androst-5-en-3-one*

To vigorously stirred solution of 16α-fluoro-17α-chloroethynyl-androst-5-ene-3β,17β-diol (3.7 g.) in 185 ml. of acetone is added 5.0 ml. of 8 N Jones reagent at room temperature over a period of approximately 20 seconds in a nitrogen atmosphere. Vigorous stirring is continued for ten minutes and one liter of ether is added. The mixture is washed to neutrality with water and dried over anhydrous potassium carbonate. The drying agent is removed by filtration and the solution evaporated at 60° C./0.5 mm. of Hg to give a mixture of the desired compound and the corresponding 3-oxo-4-ene which is separated chromatographically.

This procedure is also utilized to prepare 16α-fluoro-17α-bromoethynyl-17β-hydroxy-androst-5-ene-3-one; 16α-fluoro-17α-trifluorovinyl-17β-hydroxy-androst-5-en-3-one; 16α-fluoro-17α-trifluoropropynyl-17β-hydroxy-androst-5-ene-3-one and the corresponding 3-oxo-4-enes of these compounds.

The procedure as similarly employed in the preparation of the corresponding 17α-hydroxy compounds in the androstene series, and to prepare both 17α- and 17β-hydroxy compounds in the estrene series. All isomers are separated by chromatography.

It is not essential to separate isomers since the mixture of Δ⁴- and Δ⁵-compounds may be converted to substantially 100% of the Δ⁴-compound by treatment with acid as described in the next example.

*Example 5. — 16α-fluoro-17α-chloroethynyl-17β-hydroxy-androst-4-en-3-one*

A mixture of 3.13 g. of the Δ⁴- and Δ⁵-compounds prepared in accordance with previous example is dissolved in 100 ml. of acetone containing 300 mg. of p-toluenesulfonic acid monohydrate, the solution heated on the steam bath under nitrogen for 30 minutes and evaporated to approximately 25 ml. at 60° C./50 mm. of Hg. After the addition of 250 ml. of ether, the mixture is washed with aqueous sodium bicarbonate, dried over anhydrous magnesium sulfate, filtered and the desired product obtained by removal of the solvent in vacuo. It is purified by chromatography over acid washed alumina using benzene-ether solvents.

This procedure is also utilized to prepare the following compounds:

16α-fluoro-17β-chloroethynyl-17α-hydroxy-androst-4-en-3-one;
16α-fluoro-17α-bromoethynyl-17β-hydroxy-androst-4-en-3-one;
16α-fluoro-17β-bromoethynyl-17α-hydroxy-androst-4-en-3-one;
16α-fluoro-17α-trifluorovinyl-17β-hydroxy-androst-4-en-3-one;
16α-fluoro-17β-trifluorovinyl-17α-hydroxy-androst-4-en-3-one;
16α-fluoro-17α-trifluoropropynyl-17β-hydroxy-androst-4-en-3-one;

16α-fluoro-17β-trifluoropropynyl-17α-hydroxy-androst-4-en-3-one;
16α-fluoro-17α-chloroethynyl-17β-hydroxy-estr-4-en-3-one;
16α-fluoro-17β-chloroethynyl-17α-hydroxy-estr-4-en-3-one;
16α-fluoro-17α-bromoethynyl-17β-hydroxy-estr-4-en-3-one;
16α-fluoro-17β-bromoethynyl-17α-hydroxy-estr-4-en-3-one;
16α-fluoro-17α-trifluorovinyl-17β-hydroxy-estr-4-en-3-one;
16α-fluoro-17β-trifluorovinyl-17α-hydroxy-estr-4-en-3-one;
16α-fluoro-17α-trifluoropropynl-17β-hydroxy-estr-4-en-3-one;
16α-fluoro-17β-trifluoropropynyl-17α-hydroxy-estr-4-en-3-one.

*Example 6.—3-ethoxy-16α-fluoro-17α-chloroethynyl-androsta-3,5-dien-17β-ol*

To a solution containing 200 mg. of 16α-fluoro-17α-chloroethynyl-17β-hydroxy-androst-4-en-3-one and 0.5 ml. of ethylorthoformate in 1 ml. of ethyl alcohol is added 30 mg. of recrystallized 3,5-dinitrobenzenesulfonic acid in 0.3 ml. of ethyl alcohol at room temperature and the mixture allowed to stand for 15 minutes. At the end of this time, the mixture is diluted with 40 ml. of ether and 0.5 ml. of pyridine is added. The mixture is then washed to neutrality with water, dried over anhydrous potassium carbonate, filtered and evaporated in vacuo to provide the desired product. This procedure is utilized to prepare the following compounds:

3-ethoxy-16α-fluoro-17β-chloroethynyl-androsta-3,5-dien-17α-ol;
3-ethoxy-16α-fluoro-17α-bromoethynyl-androsta-3,5-dien-17β-ol;
3-ethoxy-16α-fluoro-17β-bromoethynyl-androsta-3,5-dien-17α-ol;
3-ethoxy-16α-fluoro-17α-trifluorovinyl-androsta-3,5-dien-17β-ol;
3-ethoxy-16α-fluoro-17β-trifluorovinyl-androsta-3,5-dien-17α-ol;
3-ethoxy-16α-fluoro-17α-trifluoropropynyl-androsta-3,5-dien-17β-ol;
3-ethoxy-16α-fluoro-17β-trifluoropropynyl-androsta-3,5-dien-17α-ol;
3-ethoxy-16α-fluoro-17α-chloroethynyl-estra-3,5-dien-17β-ol;
3-ethoxy-16α-fluoro-17β-chloroethynyl-estra-3,5-dien-17α-ol;
3-ethoxy-16α-fluoro-17α-bromoethynyl-estra-3,5-dien-17β-ol;
3-ethoxy-16α-fluoro-17β-bromoethynyl-estra-3,5-dien-17α-ol;
3-ethoxy-16α-fluoro-17α-trifluorovinyl-estra-3,5-dien-17β-ol;
3-ethoxy-16α-fluoro-17β-trifluorovinyl-estra-3,5-dien-17α-ol;
3-ethoxy-16α-fluoro-17α-trifluoropropynyl-estra-3,5-dien-17β-ol;
3-ethoxy-16α-fluoro-17β-trifluoropropynyl-estra-3,5-dien-17α-ol.

This procedure is similarly employed to make other enol ethers of the compounds listed above including, for example, the 3-cyclopentyloxy, 3-benzyloxy, 3-butyloxy and 3-cyclohexyloxy compounds.

*Example 7.—3-cyclohexyloxy-16α-fluoro-17α-chloroethynyl-androsta-3,5-dien-17β-ol*

A mixture of 50 ml. of 3-ethoxy-16α-fluoro-17α-chloroethynyl-androsta-3,5-dien-17β-ol, 5.5 ml. of isooctane, 25 ml. of cyclohexanol and 2.5 mg. of p-toluenesulfonic acid is heated under reflux for a period of approximately 32 hours in an apparatus provided for the separation of water from the condensate before return to the refluxing mixture. The reaction mixture is cooled, 0.1 ml. of pyridine is added to neutralize the acid catalyst and the mixture evaporated to dryness to give the desired product as a residue.

This transetherification reaction is similarly utilized to prepare other enol ethers such as those listed in Example 6.

*Example 8.—6β,16α-difluoro-17α-chloroethynyl-17β-hydroxy-androst-4-en-3-one*

Perchloryl fluoride is bubbled for 5 minutes through an ice cold pyridine solution (16 ml. dry), containing 900 mg. of 3 - ethoxy-16α-fluoro-17α-chloroethynyl-androsta-3,5-dien-17β-ol which has been flushed with nitrogen and the solution again flushed with nitrogen. The solution is brought almost to dryness in vacuo, taken up in ether, washed with aqueous sodium dihydrogen phosphate, water, dried over anhydrous magnesium sulfate, filtered and evaporated in vacuo to leave the desired product as a residue.

The following compounds are similarly prepared:

6β,16α-difluoro-17β-chloroethynyl-17α-hydroxy-androst-4-en-3-one;
6β,16α-difluoro-17α-bromoethynyl-17β-hydroxy-androst-4-en-3-one;
6β,16α-difluoro-17β-bromoethynyl-17α-hydroxy-androst-4-en-3-one;
6β,16α-difluoro-17α-trifluorovinyl-17β-hydroxy-androst-4-en-3-one;
6β,16α-difluoro-17β-trifluorovinyl-17α-hydroxy-androst-4-en-3-one;
6β,16α-difluoro-17α-trifluoropropynyl-17β-hydroxy-androst-4-en-3-one;
6β,16α-difluoro-17β-trifluoropropynyl-17α-hydroxy-androst-4-en-3-one;
6β,16α-difluoro-17α-chloroethynyl-17β-hydroxy-estr-4-en-3-one.
6β,16α-difluoro-17β-chloroethynyl-17α-hydroxy-estr-4-en-3-one;
6β,16α-difluoro-17α-bromoethynyl-17β-hydroxy-estr-4-en-3-one;
6β,16α-difluoro-17β-bromoethynyl-17α-hydroxy-estr-4-en-3-one;
6β,16α-difluoro-17α-trifluorovinyl-17β-hydroxy-estr-4-en-3-one;
6β,16α-difluoro-17β-trifluorovinyl-17α-hydroxy-estr-4-en-3-one;
6β,16α-difluoro-17α-trifluoropropynyl-17β-hydroxy-estr-4-en-3-one;
6β,16α-difluoro-17β-difluorotrifluoropropynyl-17α-hydroxy-estr-hydroxy-estr-4-en-3-one.

*Example 9.—6α,16α-difluoro-17α-chloroethynyl-17β-hydroxy-androst-4-en-3-one*

A solution of 260 mg. of 6β,16α-difluoro-17α-chloroethynyl - 17β-hydroxy-androst-4-en-3-one is chloroform saturated wtih dry hydrogen chloride is allowed to stand at room temperature for 18 hours and then partly evaporated in vacuo to remove most of the hydrogen chloride. After the addition of 50 ml. of additional chloroform, the solution is washed wtih excess aqueous sodium bicarbonate, dried over anhydrous magnesium sulfate, filtered and evaporated in vacuo. The residue is crystallized from benzene to give the desired product.

This procedure is utilized to prepare the following compounds:

6α,16α-difluoro-17β-chloroethynyl-17α-hydroxy-androst-4-en-3-one;
6α,16α-difluoro-17α-bromoethynyl-17β-hydroxy-androst-4-en-3-one;
6α,16α-difluoro-17β-bromoethynyl-17α-hydroxy-androst-4-en-3-one;
6α,16α-difluoro-17α-trifluorovinyl-17β-hydroxy-androst-4-en-3-one;

6α,16α-difluoro-17β-trifluorovinyl-17α-hydroxy-androst-4-en-3-one;
6α,16α-difluoro-17α-trifluoropropynyl-17β-hydroxy-androst-4-en-3-one;
6α,16α-difluoro-17β-trifluoropropynyl-17α-hydroxy-androst-4-en-3-one;
6α,16α-difluoro-17α-bromoethynyl-17β-hydroxy-estr-4-en-3-one;
6α,16α-difluoro-17β-chloroethynyl-17β-hydroxy-estr-4-en-3-one;
6α,16α-difluoro-17α-bromovinyl-17β-hydroxy-estr-4-en-3-one;
6α,16α-difluoro-17β-bromoethynyl-17β-hydroxy-estr-4-en-3-one;
6α,16α-difluoro-17α-trifluorovinyl-17β-hydroxy-estr-4-en-3-one;
6α,16α-difluoro-17β-trifluorovinyl-17α-hydroxy-estr-4-en-3-one;
6α,16α-difluoro-17α-trifluoropropynyl-17β-hydroxy-estr-4-en-3-one;
6α,16α-difluoro-17β-trifluoropropynyl-17α-hydroxy-estr-4-en-3-one;

*Example 10.—6α-chloro-16α-fluoro-17α-chloroethynyl-17β-hydroxy-androst-4-en-3-one*

A solution of 3-ethoxy-16α-fluoro-17α-chloro-ethynyl-androsta-3,5-dien-17β-ol and a 10% molar excess of N-chlorosuccinimide in 3 ml. of glacial acetic acid and 2 ml. in a 5% solution of hydrogen chloride in tetrahydrofuran is stored in an ice bath for three hours. The mixture is then poured into water and extracted with chloroform. After washing the extracts with water, 5% sodium bisulfite and 5% sodium bicarbonate in water, the chloroform solution is dried over anhydrous sodium sulfate and concentrated to leave the desired product as a residue.

This procedure is utilized to prepare the following compounds:

6α-chloro-16α-fluoro-17β-chloroethynyl-17α-hydroxy-androsta-4-en-3-one;
6α-chloro-16α-fluoro-17α-bromoethynyl-17β-hydroxy-androsta-4-en-3-one;
6α-chloro-16α-fluoro-17β-bromoethynyl-17α-hydroxy-androsta-4-en-3-one;
6α-chloro-16α-fluoro-17α-trifluorovinyl-17β-hydroxy-androsta-4-en-3-one;
6α-chloro-16α-fluoro-17β-trifluorovinyl-17α-hydroxy-androsta-4-en-3-one;
6α,16α-difluoro-17β-trifluoropropynyl-17α-hydroxy-androsta-4-en-3-one;
6α-chloro-16α-fluoro-17β-trifluoropropynyl-17α-hydroxy-androsta-4-en-3-one;
6α-chloro-16α-fluoro-17α-chloroethynyl-17β-hydroxy-estra-4-en-3-one;
6α-chloro-16α-fluoro-17β-chloroethynyl-17α-hydroxy-estra-4-en-3-one;
6α-chloro-16α-fluoro-17α-bromoethynyl-17β-hydroxy-estra-4-en-3-one;
6α-chloro-16α-fluoro-17β-bromoethynyl-17α-hydroxy-estra-4-en-3-one;
6α-chloro-16α-fluoro-17α-trifluorovinyl-17β-hydroxy-estra-4-en-3-one;
6α-chloro-16α-fluoro-17β-trifluorovinyl-17α-hydroxy-estra-4-en-3-one;
6α-chloro-16α-fluoro-17α-trifluoropropynyl-17β-hydroxy-estra-4-en-3-one;
6α-chloro-16e-fluoro-17β-trifluoropropynyl-17α-hydroxy-estra-4-en-3-one.

*Example 11.—6α-chloro-16α-fluoro-17α-chloroethynyl-17β-hydroxy-androst-4-en-3-one*

A solution of 1 g. of 17β-acetoxy-6α-chloro-16α-fluoro-17α-chloroethynyl-androst-4-en-3-one in 30 ml. of methanol is treated with 1 g. of potassium bicarbonate in 10 ml. of water under nitrogen at reflux temperature for seven minutes. The mixture is cooled, neutralized with 1 ml. of acetic acid and 10 ml. of water, the methanol removed in vacuo and the product extracted into ethyl acetate. Removal of the ethyl acetate in vacuo leaves the desired product as a residue.

This procedure is utilized to prepare the following compounds:

6α-chloro-16α-fluoro-17β-chloroethynyl-17α-hydroxy-androst-4-en-3-one;
6α-chloro-16α-fluoro-17α-bromoethynyl-17β-hydroxy-androst-4-en-3-one;
6α-chloro-16α-fluoro-17β-bromoethynyl-17α-hydroxy-androst-4-en-3-one;
6α-chloro-16α-fluoro-17α-trifluorovinyl-17β-hydroxy-androst-4-en-3-one;
6α-chloro-16α-fluoro-17β-trifluorovinyl-17α-hydroxy-androst-4-en-3-one;
6α-chloro-16α-fluoro-17α-trifluoropropynyl-17β-hydroxy-androst-4-en-3-one;
6α-chloro-16α-fluoro-17β-trifluoropropynyl-17α-hydroxy-androst-4-en-3-one;
6α-chloro-16α-fluoro-17α-chloroethynyl-17β-hydroxy-estr-4-en-3-one;
6α-chloro-16α-fluoro-17β-chloroethynyl-17α-hydroxy-estr-4-en-3-one;
6α-chloro-16α-fluoro-17α-bromoethynyl-17β-hydroxy-estr-4-en-3-one;
6α-chloro-16α-fluoro-17β-bromoethynyl-17α-hydroxy-estr-4-en-3-one;
6α-chloro-16α-fluoro-17α-trifluorovinyl-17β-hydroxy-estr-4-en-3-one;
6α-chloro-16α-fluoro-17β-trifluorovinyl-17α-hydroxy-estr-4-en-3-one;
6α-chloro-16α-fluoro-17α-trifluoropropynyl-17β-hydroxy-estr-4-en-3-one;
6α-chloro-16α-fluoro-17β-trifluoropropynyl-17α-hydroxy-estr-4-en-3-one.

*Example 12.—3-ethoxy-6-chloro-16α-fluoro-17α-chloroethynyl-androsta-3,5-dien-17β-ol*

To a solution containing 200 mg. of 6α-chloro-16α-fluoro-17α-chloroethynyl-17β-hydroxy-androst-4-en-3-one and 813 mg. of triethyl orthoformate in 1 ml. of ethyl alcohol, there is added 40 mg. of 3,5-dinitrobenzenesulfonic acid in .3 of ml. of this solvent. At the end of 15 minutes the solution is diluted with 40 ml. of ether and 0.5 ml. of pyridine is added. The mixture is then washed to neutrality with water, dried over anhydrous potassium bicarbonate, filtered and evaporated in vacuo to give the desired product as a residue.

This procedure is also utilized to prepare the following compounds:

3-ethoxy-6-chloro-16α-fluoro-17β-chloroethynyl-androsta-3,5-dien-17α-ol;
3-ethoxy-6-chloro-16α-fluoro-17α-bromoethynyl-androsta-3,5-dien-17β-ol;
3-ethoxy-6-chloro-16α-fluoro-17β-bromoethynyl-androsta-3,5-dien-17α-ol;
3-ethoxy-6-chloro-16α-fluoro-17α-trifluorovinyl-androsta-3,5-dien-17β-ol;
3-ethoxy-6-chloro-16α-fluoro-17β-trifluorovinyl-androsta-3,5-dien-17α-ol;
3-ethoxy-6-chloro-16α-fluoro-17α-trifluoropropynyl-androsta-3,5-dien-17β-ol;
3-ethoxy-6-chloro-16α-fluoro-17β-trifluoropropynyl-androsta-3,5-dien-17α-ol;
3-ethoxy-6-chloro-16α-fluoro-17α-chloroethynyl-estr-3,5-dien-17β-ol;
3-ethoxy-6-chloro-16α-fluoro-17β-chloroethynyl-estra-3,5-dien-17α-ol;
3-ethoxy-6-chloro-16α-fluoro-17α-bromoethynyl-estra-3,5-dien-17β-ol;
3-ethoxy-6-chloro-16α-fluoro-17β-bromoethynyl-estra-3,5-dien-17α-ol;

3-ethoxy-6-chloro-16α-fluoro-17α-trifluorovinyl-estra-3,5-dien-17β-ol;
3-ethoxy-6-chloro-16α-fluoro-17β-trifluorovinyl-estra-3,5-dien-17α-ol;
3-ethoxy-6-chloro-16α-fluoro-17α-trifluoropropynyl-estra-3,5-dien-17β-ol;
3-ethoxy-6-chloro-16α-fluoro-17β-trifluoropropynyl-estra13,5-dien-17α-ol;
3-ethoxy-6,16α-difluoro-17α-chloroethynyl-androsta-3,5-dien-17β-ol;
3-ethoxy-6,16α-difluoro-17β-chloroethynyl-androsta-3,5-dien-17α-ol;
3-ethoxy-6,16α-difluoro-17α-bromoethynyl-androsta-3,5-dien-17β-ol;
3-ethoxy-6,16α-difluoro-17β-bromoethynyl-androsta-3,5-dien-17α-ol;
3-ethoxy-6,16α-difluoro-17α-trifluorovinyl-androsta-3,5-dien-17β-ol;
3-ethoxy-6,16α-difluoro-17β-trifluorovinyl-androsta-3,5-dien-17α-ol;
3-ethoxy-6,16α-difluoro-17α-trifluoropropynyl-androsta-3,5-dien-17β-ol;
3-ethoxy-6,16α-difluoro-17β-trifluoropropynyl-androsta-3,5-dien-17α-ol;
3-ethoxy-6,16α-difluoro-17α-chloroethynyl-estra-3,5-dien-17β-ol;
3-ethoxy-6,16α-difluoro-17β-chloroethynyl-estra-3,5-dien-17α-ol;
3-ethoxy-6,16α-difluoro-17α-bromoethynyl-estra-3,5-dien-17β-ol;
3-ethoxy-6,16α-difluoro-17β-bromoethynyl-estra-3,5-dien-17α-ol;
3-ethoxy-6,16α-difluoro-17α-trifluorovinyl-estra-3,5-dien-17β-ol;
3-ethoxy-6,16α-difluoro-17β-trifluorovinyl-estra-3,5-dien-17α-ol;
3-ethoxy-6,16α-difluoro-17α-trifluoropropynyl-estra-3,5-dien-17β-ol;
3-ethoxy-6,16α-difluoro-17β-trifluoropropynyl-estra-3,5-dien-17α-ol.

*Example 13.—6β-bromo-16α-fluoro - 17α - chloroethynyl-17β-hydroxy-androst-4-en-3-one*

A solution of 1 g. of 3-ethoxy-16α-fluoro-17α-chloroethynyl-androsta-3,5-dien-17β-ol and 700 mg. of sodium acetate in 5 ml. of water and 40 ml. of acetone is cooled to 0° C. and 1.07 g. of N-bromosuccinimide and 0.83 ml. of acetic acid is added. The mixture is stirred for three hours at 0.5° C. and then poured into water to precipitate the desired produce, which is recovered by filtration.

This procedure is utilized to prepare the following compounds from the appropriate starting materials. Although 3-ethoxy enol ethers are the preferred starting agents, other enol ethers such as the 3-benzyloxy compounds prepared in accordance with the procedures of the foregoing examples may also be used.

6β-bromo-16α-fluoro-17β-chloroethynyl-17α-hydroxy-androst-4-en-3-one.
6β-bromo-16α-fluoro-17α-bromoethynyl-17β-hydroxy-androst-4-en-3-one;
6β-bromo-16α-fluoro-17β-bromoethynyl-17α-hydroxy-androst-4-en-3-one;
6β-bromo-16α-fluoro-17α-trifluorovinyl-17β-hydroxy-androst-4-en-3-one;
6β-bromo-16α-fluoro-17β-trifluorovinyl-17α-hydroxy-androst-4-en-3-one;
6β-bromo-16α-fluoro-17α-trifluoropropynyl-17β-hydroxy-androst-4-en-3-one;
6β-bromo-16α-fluoro-17β-trifluoropropynyl-17α-hydroxy-androst-4-en-3-one;
6β-bromo-16α-fluoro-17α-chloroethynyl-17β-hydroxy-estra-4-en-3-one;
6β-bromo-16α-fluoro-17β-chloroethynyl-17α-hydroxy-estr-4-en-3-one;
6β-bromo-16α-fluoro-17α-bromoethynyl-17β-hydroxy-estr-4-en-3-one;
6β-bromo-16α-fluoro-17β-bromoethynyl-17α-hydroxy-estr-4-en-3-one;
6β-bromo-16α-fluoro-17α-trifluorovinyl-17β-hydroxy-estr-4-en-3-one;
6β-bromo-16α-fluoro-17β-trifluorovinyl-17α-hydroxy-estr-4-en-3-one;
6β-bromo-16α-fluoro-17α-trifluoropropynyl-17β-hydroxy-estr-4-en-3-one;
6β-bromo-16α-fluoro-17β-trifluoropropynyl-17α-hydroxy-estr-4-en-3-one.

*Example 14.—16α-fluoro-17α-chloroethynyl-17β-hydroxy-androsta-4,6-dien-3-one*

A mixture containing 1 g. of 6β-bromo-16α-fluoro-17α-chloroethynyl-17β-hydroxy-androst-4-en - 3 - one, 1 g. of lithium bromide and 500 ml. of lithium carbonate in 20 ml. of dimethylformamide is allowed to stand for five hours at 120° C. and diluted with ice water to precipitate the desired compound which is recovered by filtration.

This procedure is utilized to prepare the following compounds:

16α-fluoro-17β-chloroethynyl-17α-hydroxy-androsta-4,6-dien-3-one;
16α-fluoro-17α-bromoethynyl-17β-hydroxy-androsta-4,6-dien-3-one;
16α-fluoro-17β-bromoethynyl-17α-hydroxy-androsta-4,6-dien-3-one;
16α-fluoro-17α-trifluorovinyl-17β-hydroxy-androsta-4,6-dien-3-one;
16α-fluoro-17β-trifluorovinyl-17α-hydroxy-androsta-4,6-dien-3-one;
16α-fluoro-17α-trifluoropropynyl-17β-hydroxy-androsta-4,6-dien-3-one;
16α-fluoro-17β-trifluoropropynyl-17α-hydroxy-androsta-4,6-dien-3-one;
16α-fluoro-17α-chloroethynyl-17β-hydroxy-estra-4,6-dien-3-one;
16α-fluoro-17β-chloroethynyl-17α-hydroxy-estra-4,6-dien-3-one;
16α-fluoro-17α-bromoethynyl-17β-hydroxy-estra-4,6-dien-3-one;
16α-fluoro-17β-bromoethynyl-17α-hydroxy-estra-4,6-dien-3-one;
16α-fluoro-17α-trifluorovinyl-17β-hydroxy-estra-4,6-dien-3-one;
16α-fluoro-17β-trifluorovinyl-17α-hydroxy-estra-4,6-dien-3-one;
16α-fluoro-17α-trifluoropropynyl-17β-hydroxy-estra-4,6-dien-3-one;
16α-fluoro-17β-trifluorovinyl-17α-hydroxy-estra-4,6-dien-3-one
16α-fluoro-17α-trifluoropropynyl-17β-hydroxy-estra-4,6-dien-3-one;
16α-fluoro-17β-trifluoropropynyl-17α-hydroxy-estra-4,6-dien-3-one.

*Example 15.—16α-fluoro-17α-chloroethynyl-6α,7α-oxido-17β-hydroxy-androst-4-en-3-one*

A solution of 675 mg. of 16α-fluoro-17α-chloro-ethynyl-17β-hydroxy-androsta-4,6-dien-3-one and 30 ml. of 0.2 N perbenzoic acid in benzene and 30 ml. of ether is allowed to stand at room temperature in the dark for 68 hours. The resulting benzene-ether solution is washed with sodium bisulfite solution, water, 0.5 N-potassium hydroxide solution and again with water. The washed benzene-ether reaction solution is dried and the solvent removed in vacuo to give the desired compound as a residue.

The same procedure is utilized to prepare the following compounds:

16α-fluoro-17β-chloroethynyl-6α,7α-oxido-17α-hydroxy-androst-4-en-3-one;

16α-fluoro-17α-bromoethynyl-6α,7α-oxido-17β-hydroxy-androst-4-en-3-one;
16α-fluoro-17β-bromoethynyl-6α,7α-oxido-17α-hydroxy-androst-4-en-3-one;
16α-fluoro-17α-trifluorovinyl-6α,7α-oxido-17β-hydroxy-androst-4-en-3-one;
16α-fluoro-17β-trifluorovinyl-6α,7α-oxido-17α-hydroxy-androst-4-en-3-one;
16α-fluoro-17α-trifluoropropynyl-6α,7α-oxido-17β-hydroxy-androst-4-en-3-one;
16α-fluoro-17β-trifluoropropynyl-6α,7α-oxido-17α-hydroxy-androst-4-en-3-one;
16α-fluoro-17α-chloroethynyl-6α,7α-oxido-17β-hydroxy-estr-4-en-3-one;
16α-fluoro-17β-chloroethynyl-6α,7α-oxido-17α-hydroxy-estr-4-en-3-one;
16α-fluoro-17α-bromoethynyl-6α,7α-oxido-17β-hydroxy-estr-4-en-3-one;
16α-fluoro-17b-bromoethynyl-6α,7α-oxido-17α-hydroxy-estr-4-en-3-one;
16α-fluoro-17α-trifluorovinyl-6α,7α-oxido-17β-hydroxy-estr-4-en-3-one;
16α-fluoro-17β-trifluorovinyl-6α,7α-oxido-17α-hydroxy-estr-4-en-3-one;
16α-fluoro-17α-trifluoropropynyl-6α,7α-oxido-17β-hydroxy-estr-4-en-3-one;
16α-fluoro-17β-trifluoropropynyl-6α,7α-oxido-17α-hydroxy-estr-4-en-3-one.

*Example 16.—6-chloro-16α-fluoro-17α-chloroethynyl-17β-hydroxy-androsta-4,6-dien-3-one*

The 16α - fluoro - 17α - chloroethynyl - 6α,7α-oxido-17β-hydroxy-androst-4-en-3-one prepared in the previous example is dissolved in 20 ml. of 0.4 N solution hydrogen chloride in chloroform and the resulting mixture is allowed to stand for 5½ hours at room temperature. The reaction mixture is then poured into iced sodium bicarbonate solution. The aqueous mixture is extracted with chloroform and the chloroform extract evaporated to dryness in vacuo to leave the desired product as a residue. It may be purified by chromatography on acid washed alumina using ether-petroleum ether solvents.

The procedure of this example is utilized to prepare the following compounds:

6-chloro-16α-fluoro-17β-bromoethynyl-17α-hydroxy-androsta-4,6-dien-3-one;
6-chloro-16α-fluoro-17α-bromoethynyl-17β-hydroxy-androsta-4,6-dien-3-one;
6-chloro-16α-fluoro-17β-bromoethynyl-17α-hydroxy-androsta-4,6-dien-3-one;
6-chloro-16α-fluoro-17α-trifluorovinyl-17β-hydroxy-androsta-4,6-dien-3-one;
6-chloro-16α-fluoro-17β-trifluorovinyl-17α-hydroxy-androsta-4,6-dien-3-one;
6-chloro-16α-fluoro-17α-trifluoropropynyl-17β-hydroxy-androsta-4,6-dien-3-one;
6-chloro-16α-fluoro-17β-trifluoropropynyl-17α-hydroxy-androsta-4,6-dien-3-one;
6-chloro-16α-fluoro-17α-chloroethynyl-17β-hydroxy-estra-4,6-dien-3-one;
6-chloro-16α-fluoro-17β-bromoethynyl-17α-hydroxy-estra-4,6-dien-3-one;
6-chloro-16α-fluoro-17α-bromoethynyl-17β-hydroxy-estra-4,6-dien-3-one;
6-chloro-16α-fluoro-17β-bromoethynyl-17α-hydroxy-estra-4,6-dien-3-one;
6-chloro-16α-fluoro-17α-trifluorovinyl-17β-hydroxy-estra-4,6-dien-3-one;
6-chloro-16α-fluoro-17β-trifluorovinyl-17α-hydroxy-estra-4,6-dien-3-one;
6-chloro-16α-fluoro-17α-trifluoropropynyl-17β-hydroxy-estra-4,6-dien-3-one;
6-chloro-16α-fluoro-17β-trifluoropropynyl-17α-hydroxy-estra-4,6-dien-3-one.

*Example 17.—16α-fluoro-17α-chloroethynyl-17β-hydroxy-androsta-4,6-dien-3-one*

Chloranil (600 mg.) is added to 300 mg. of 16α-fluoro-17α - chloroethynyl - 17β - hydroxy - androst - 4 - en - 3-one in 18 ml. of propyl acetate containing 3.6 ml. of glacial acetic acid. The reaction mixture is heated under reflux for 18 hours in a nitrogen atmosphere. After cooling, it is diluted with ethyl acetate, washed with water, dried, evaporated to dryness, taken up in ether and chromatographed on 15 g. of acid washed alumina. The product is recovered by elution with ether and ether-chloroform, 3:2.

This procedure is utilized to prepare the following compounds:

16α-fluoro-17β-chloroethynyl-17α-hydroxy-androsta-4,6-dien-3-one;
16α-fluoro-17α-bromoethynyl-17β-hydroxy-androsta-4,6-dien-3-one;
16α-fluoro-17β-bromoethynyl-17α-hydroxy-androsta-4,6-dien-3-one;
16α-fluoro-17α-trifluorovinyl-17β-hydroxy-androsta-4,6-dien-3-one;
16α-fluoro-17β-trifluorovinyl-17α-hydroxy-androsta-4,6-dien-3-one;
16α-fluoro-17α-trifluoropropynyl-17β-hydroxy-androsta-4,6-dien-3-one;
16α-fluoro-17β-trifluoropropynyl-17α-hydroxy-androsta-4,6-dien-3-one;
16α-fluoro-17α-chloroethynyl-17β-hydroxy-estra-4,6-dien-3-one;
16α-fluoro-17β-chloroethynyl-17α-hydroxy-estra-4,6-dien-3-one;
16α-fluoro-17α-bromoethynyl-17β-hydroxy-estra-4,6-dien-3-one;
16α-fluoro-17β-bromoethynyl-17α-hydroxy-estra-4,6-dien-3-one;
16α-fluoro-17α-trifluorovinyl-17β-hydroxy-estra-4,6-dien-3-one;
16α-fluoro-17β-trifluorovinyl-17α-hydroxy-estra-4,6-dien-3-one;
16α-fluoro-17α-trifluoropropynyl-17β-hydroxy-estra-4,6-dien-3-one;
16α-fluoro-17β-trifluoropropynyl-17α-hydroxy-estra-4,6-dien-3-one;

6-chloro and 6-fluoro-5,6-diene derivatives of the above listed compounds are similarly prepared utilizing chloranil or similar 4,6-dehydrogenating quinone and the appropriate 3-oxo-4-ene.

*Example 18.—17β-acetoxy-16α-fluoro-17α-chloroethynyl-androsta-4,6-dien-3-one*

A mixture containing 100 mg. of 16α-fluoro-17α-chloroethynyl-17β-hydroxy-androsta-4,6-diene-3-one and 1 ml. of acetic anhydride in 1 ml. of pyridine is heated on the steam bath overnight. The reaction mixture is then poured onto ice and extracted with chloroform. The extract is washed with water and concentrated. The concentrate is chromatographed over acid washed alumina and eluted with mixtures of ether and petroleum-ether to give the desired product.

Other esters of the $\Delta^{4,6}$-compounds prepared in accordance with the procedure of the previous example are similarly prepared. These include the compounds in which the hydrogen of 17-hydroxyl group is replaced by benzoyl, propionyl, butyryl or caprylyl radicals.

*Example 19.—3,17β-diacetoxy-16α-fluoro-17α-chloroethynyl-androsta-3,5-diene and 17β-acetoxy-16α-fluoro-17α-chloroethynyl-androst-4-en-3-one*

Three hundred mg. of 16α-fluoro-17α-chloroethynyl-17β-hydroxy-androsta-4-en-3-one is dissolved in 10 ml. of 3:2 pyridine and acetic anhydride and heated on a steam bath under nitrogen for 7 hours. The mixture is poured into ice water and extracted with ether. The ether layer is separated and the aqueous layer extracted several more times with ether. Combined ethereal solutions are washed with water, dilute aqueous sodium bicarbonate and again with water. The organic layer is dried over anhydrous magnesium sulfate, filtered and the solvent removed. The residue is dissolved in benzene, chromatographed on acid washed alumina and then diluted with mixtures of petroleum ether-ether. The more polar enol diacetate separates with the early fractions. The less polar 3-oxo-17-monoacetate separates with the later fractions.

This procedure is utilized to prepare enol diacylates and 17-monoacylates of the following compounds:

16α-fluoro-17α-chloroethynyl-17β-hydroxy-androst-4-en-3-one;
16α-fluoro-17β-chloroethynyl-17α-hydroxy-androst-4-en-3-one;
16α-fluoro-17αbromoethynyl-17β-hydroxy-androst-4-en-3-one;
16α-fluoro-17β-bromoethynyl-17α-hydroxyandrost-4-en-3-one;
16α-fluoro-17α-trifluorovinyl-17β-hydroxy-androst-4-en-3-one;
16α-fluoro-17β-trifluorovinyl-17α-hydroxy-androst-4-en-3-one;
16α-fluoro-17α-trifluoropropynyl-17β-hydroxy-androst-4-en-3-one;
16α-fluoro-17β-trifluoropropynyl-17α-hydroxy-androst-4-en-3-one;
16α-fluoro-17α-chloroethynyl-17β-hydroxy-estr-4-en-3-one;
16α-fluoro-17β-chloroethynyl-17α-hydroxy-estr-4-en-3-one;
16α-fluoro-17α-bromoethynyl-17β-hydroxy-estr-4-en-3-one;
16α-fluoro-17β-bromoethynyl-17α-androxy-estr-4-en-3-one;
16α-fluoro-17α-trifluorovinyl-17β-hydroxy-estr-4-en-3-one;
16α-fluoro-17β-trifluorovinyl-17α-hydroxy-estr-4-en-3-one;
16α-fluoro-17α-trifluoropropynyl-17β-hydroxy-estr-4-en-3-one;
16α-fluoro-17β-trifluoropropynyl-17α-hydroxy-estr-4-en-3-one.

This procedure is utilized to prepare, for example, diacetates, dipropionates, dibutyrates, dicaprylylates and dibenzoates of the above listed 6-dehalo compounds as well as corresponding 6-chloro and 6-fluoro compounds. The 17-monoacylates are prepared concurrently and separated as described.

*Example 20.—17β-acetoxy-16α-fluoro-17α-chloroethynyl-androst-4-en-3β-ol*

A solution of 165 mg. of 17β-acetoxy-16α-fluoro-17α-chloroethynyl-androst-4-en-3-one prepared in accordance with the procedure of the foregoing example in 1.5 ml. of dry tetrahydrofuran is added to 500 mg. of lithium aluminum hydride tri-tertiary butoxide in 5 ml. of tetrahydrofuran at approximately 0° C. The mixture is sealed and maintained at 0° C. for 15 minutes. It is then allowed to warm to room temperature and is maintained at this temperature for one hour. At the end of this period, 25 ml. of ether is added and the mixture cooled in an ice bath. It is then poured into water with vigorous agitation. The mixture is filtered, the layers separated and the ethereal solution washed with water until the washings are neutral. The organic layer is dried over anhydrous magnesium sulfate, filtered and the solvent removed to leave the desired product.

The 4,6-diene analog of this compound is similarly prepared.

This procedure is utilized to prepare the following compounds and their 4,6-dien analogs. Although the compounds are listed as acetoxy compounds, the procedure is equally applicable to the preparation of 17-acylates such as those prepared as described in Example 19 as well as corresponding free alcohols.

17α-acetoxy-16α-fluoro-17β-chloroethynyl-androst-4-en-3β-ol;
17β-acetoxy-16α-fluoro-17α-bromoethynyl-androst-4-en-3β-ol;
17α-acetoxy-16α-fluoro-17β-bromoethynyl-androst-4-en-3β-ol;
17β-acetoxy-16α-fluoro-17α-trifluorovinyl-androst-4-en-3β-ol;
17α-acetoxy-16α-fluoro-17β-trifluorovinyl-androst-4-en-3β-ol;
17β-acetoxy-16α-fluoro-17α-trifluoropropynyl-androst-4-en-3β-ol;
17α-acetoxy-16α-fluoro-17β-trifluoropropynyl-androst-4-en-3β-ol;
17β-acetoxy-16α-fluoro-17α-chloroethynyl-estr-4-en-3β-ol;
17α-acetoxy-16α-fluoro-17β-chloroethynyl-estr-4-en-3β-ol;
17β-acetoxy-16α-fluoro-17α-bromoethynyl-estr-4-en-3β-ol;
17α-acetoxy-16α-fluoro-17β-bromoethynyl-estr-4-en-3β-ol;
17β-acetoxy-16α-fluoro-17α-trifluorovinyl-estr-4-en-3β-ol;
17α-acetoxy-16α-fluoro-17β-trifluorovinyl-estr-4-en-3β-ol;
17β-acetoxy-16α-fluoro-17α-trifluoropropynyl-estr-4-en-3β-ol;
17α-acetoxy-16α-fluoro-17β-trifluoropropynyl-estr-4-en-3β-ol.

*Example 21.—3β-acetoxy-16α-fluoro-17α-chloroethynyl-androst-4-en-17β-ol*

One hundred eighty mg. of 16α-fluoro-17α-chloro-ethynyl-androst-4-ene-3β,17β-diol prepared in accordance with the procedure of the previous example is dissolved in 3.6 ml. of dry pyridine and 2.7 ml. of acetic anhydride added. The solution is heated under nitrogen on a steam bath for 10 minutes and cooled in an ice bath. The solution is evaporated at room temperature in vacuo and the residual gum dissolved in 1 ml. of ethanol containing a few drops of pyridine. This solution is reevaporated, and the residue dissolved in 1 ml. of ethanol and the solution diluted with 25 ml. of ether. The ethereal solution is washed with dilute aqueous sodium bicarbonate and with water until the washings are neutral. The organic layer is dried over anhydrous magnesium sulfate, filtered and evaporated in vacuo to leave the desired product as a residue.

This procedure is used to prepare a variety of 3β-esters of 3β,17-diols within the purview of this invention. Among the esters prepared are the propionates, butyrates, benzoates, phenylacetates and caprylylates. The following list illustrates compounds prepared by this procedure. Although only 6-deshalo-3-acetoxy compounds are listed, it should be understood that other esters including 6-chloro and 6-bromo esters are similarly prepared.

3β-acetoxy-16α-fluoro-17β-chloroethynyl-androst-4-en-17α-ol;
3β-acetoxy-16α-fluoro-17α-bromoethynyl-androst-4-en-17β-ol;
3β-acetoxy-16α-fluoro-17β-bromoethynyl-androst-4-en-17α-ol;
3β-acetoxy-16α-fluoro-17α-trifluorovinyl-androst-4-en-17β-ol;
3β-acetoxy-16α-fluoro-17β-trifluorovinyl-androst-4-en-17α-ol;
3β-acetoxy-16α-fluoro-17α-trifluoropropynyl-androst-4-en-17β-ol;

3β-acetoxy-16α-fluoro-17β-trifluoropropynyl-androst-4-
  en-17α-ol;
3β-acetoxy-16α-fluoro-17α-chloroethynyl-estr-4-en-17β-ol;
3β-acetoxy-16α-fluoro-17β-chloroethynyl-estr-4-en-17α-ol;
3β-acetoxy-16α-fluoro-17α-bromoethynyl-estr-4-en-17β-ol;
3β-acetoxy-16α-fluoro-17β-bromoethynyl-estr-4-en-17α-ol;
3β-acetoxy-16α-fluoro-17α-trifluorovinyl-estr-4-en-17β-ol;
3β-acetoxy-16α-fluoro-17β-trifluorovinyl-estr-4-en-17α-ol;
3β-acetoxy-16α-fluoro-17α-trifluoropropynyl-estr-4-en-
  17β-ol;
3β-acetoxy-16α-fluoro-17β-trifluoropropynyl-estr-4-en-
  17α-ol.

*Example 22.—3-ethoxy-17β-acetoxy-6,16α-difluoro-17α-
chloroethynyl-androsta-3,5-diene*

One hundred mg. of 3-ethoxy-6,16α-difluoro-17α-chloroethynyl-androsta-3,5-diene-17β-ol is heated with 1 ml. of acetic anhydride and 1.2 ml. of pyridine on the steam bath overnight. The reaction mixture is then poured into ice water and extracted with chloroform. The extract is washed with water, dried over magnesium sulfate, filtered and the filtrate evaporated to leave the desired product as a residue.

The following list is exemplary of 17-esters of enol ethers prepared in accordance with the foregoing procedure. The compounds are listed as 6-fluoro-3-ethoxy-17-acetoxy compounds so as to save unnecessary repetition. Esters of other enol ethers including 6-chloro and 6-deshalo compounds in which the ether group contains up to 6 carbon atoms and the acyl group up to 8 carbon atoms are similarly prepared.

3-ethoxy-17β-acetoxy-6,16α-difluoro-17β-chloroethynyl-
  androsta-3,5-diene;
3-ethoxy-17β-acetoxy-6,16α-difluoro-17α-bromoethynyl-
  androsta-3,5-diene;
3-ethoxy-17β-acetoxy-6,16α-difluoro-17β-bromo-
  ethylnyl-androst-3,5-diene;
3-ethoxy-17β-acetoxy-6,16α-difluoro-17α-trifluoro-
  vinyl-androsta-3,5-diene;
3-ethoxy-17β-acetoxy-6,16α-difluoro-17β-trifluoro-
  vinyl-androsta-3,5-diene;
3-ethoxy-17β-acetoxy-6,16α-difluoro-17α-trifluoro-
  propynyl-androsta-3,5-diene;
3-ethoxy-17β-acetoxy-6,16α-difluoro-17β-trifluoro-
  propynyl-androsta-3,5-diene;
3-ethoxy-17β-acetoxy-6,16α-difluoro-17α-chloroethynyl-
  estra-3,5-diene;
3-ethoxy-17β-acetoxy-6,16α-difluoro-17β-chloroethynyl-
  estra-3,5-diene;
3-ethoxy-17β-acetoxy-6,16α-difluoro-17α-bromo-
  ethynyl-estra-3,5-diene;
3-ethoxy-17β-acetoxy-6,16α-difluoro-17β-bromo-
  ethynyl-estra-3,5-diene;
3-ethoxy-17β-acetoxy-6,16α-difluoro-17α-trifluoro-
  vinyl-estra-3,5-diene;
3-ethoxy-17β-acetoxy-6,16α-difluoro-17β-trifluoro-
  vinyl-estra-3,5-diene;
3-ethoxy-17β-acetoxy-6,16α-difluoro-17α-trifluoro-
  propynyl-estra-3,5-diene;
3-ethoxy-17β-acetoxy-6,16α-difluoro-17β-trifluoro-
  propynyl-estra-3,5-diene.

*Example 23.—3-ethylenedioxy-androst-5-en-17β-ol*

To a solution containing 1 g. of 17β-hydroxy-androst-4-en-3-one in 50 cc. of benzene is added 2.5 ml. of ethylene glycol and 0.1 g. of p-toluenesulfonic acid. The resulting mixture is heated under reflux for a period of approximately 15 hours. The reaction solution is cooled, washed with aqueous sodium bicarbonate solution, dried over anhydrous sodium sulfate and the solvent removed in vacuo to leave the desired product as a residue. The product may be purified by crystallization or chromatography over alumina using ether-petroleum ether solvents.

This same procedure is utilized to prepare 3-ethylenedioxy-estr-5(6)-en-17β-ol and 3-ethylenedioxy-estr-5(10)-en-17β-ol utilizing 17β-hydroxy-estr-4-en-3-one as the starting material. A mixture of the 5(6) and 5(10)-isomers is obtained and the mixture is separated chromatographically.

*Example 24.—3-ethylenedioxy-androst-5-en-17-one*

Two g. of chromium trioxide is dissolved in 20 ml. of dry pyridine with cooling. To the resulting suspension of orange complex, a solution of 2 g. of 3-ethylenedioxy-androst-5-en-17β-ol in 20 ml. of dry pyridine is added. The reaction flask is stoppered, the contents mixed thoroughly by agitation and allowed to stand overnight. The reaction mixture is poured into 100 ml. of water and extracted with three 100 ml. portions of benzene. Filtration of the emulsions obtained through diatomaceous earth aids in separating the extracts. The benzene solutions are combined, washed with water, dried over anhydrous magnesium sulfate and the solvent removed in vacuo to leave the desired product as a residue.

This procedure is utilized to prepare 3-ethylenedioxy-estr-5(6)-en-17-one and 3-ethylenedioxy-estr-5(10)-en-17-one.

*Example 25.—3-ethylenedioxy-16-ethoxalyl-
androst-5-en-17-one*

To 3.3 g. of 3-ethylenedioxy-androst-5-en-17-one in 50 ml. of tertiary butanol is added 5 g. of sodium ethylate in 20 ml. of ethanol. To this mixture under nitrogen, there is added 3 ml. of diethyloxalate and the mixture stirred for 6 hours during which period, the desired product precipitates and is recovered by filtration.

This procedure is utilized to prepare 3-ethylenedioxy-16-ethoxalyl-estr-5(6)-en-17-one and 3 - ethylenedioxy - 16-ethoxalyl-estr-5(10)-en-17-one.

*Example 26.—16α-fluoro-3-ethylenedioxy-16β-
ethoxalyl-androst-5-en-17-one*

Perchloryl fluoride is bubbled for five minutes through an ice cold solution of 300 mg. of the product of the previous example in 20 ml. of pyridine containing 1.72 ml. of 0.63 N sodium methoxide in methanol. The mixture is then flushed with nitrogen and evaporated at 40° C. at about 2 mm. of Hg pressure. The residue is taken up in a mixture of ether-methylene chloride and aqueous sodium dihydrogen phosphate. The organic layer is separated, washed with additional aqueous sodium dihydrogen phosphate solution and with water. It is dried over anhydrous magnesium sulfate, filtered and evaporated to leave the desired product as a residue.

The procedure is utilized to prepare 16α-fluoro-3-ethylenedioxy-16β-ethoxalyl-estr-5(6)-en-17-one and 16α-fluoro - 3 - ethylenedioxy - 16β - ethoxalyl - estr - 5(10)-en-17-one.

*Example 27.—16α - fluoro - 3 - ethylenedioxy - androst-5-
en-17-one and 16β-fluoro-3-ethylenedioxy-androst-5-en-
17-one*

A solution of 0.5 g. of 16α-fluoro-3-ethylenedioxy-16β-ethoxalyl-androst-5-en-17-one in 100 ml. of 4:1 ether-methylene chloride is shaken twice with 10 ml. portions of 1 N aqueous sodium hydroxide and washed to neutrality with water. The organic layer is dried over anhydrous magnesium sulfate, filtered and evaporated to leave a mixture of 16α-fluoro and 16β-fluoro compounds. The mixture is separated chromatographically over basic alumina using benzene-ether solvents.

The same products are obtained by first taking up 0.5 g. of the identical starting compound in 1.3 ml. of methanol containing 6 mg. of sodium methoxide and allowing the mixture to stand for 3 hours at room temperature. The solution is evaporated and the residue partitioned between 20 ml. of ether and 2 ml. of aqueous sodium dihydrogen phosphate. The ethereal layer is washed with water, dried over anhydrous magnesium sulfate filtered and evaporated. The residue is a mixture of the desired 16α-fluoro and 16β-fluoro compounds which is separated chromatographically.

These procedures are also utilized to prepare 16α-fluoro-3-ethylenedioxy-estr-5(6)-en-17-one, 16α-fluoro-3-ethylenedioxy-estr-5(10)-en-17-one and the corresponding 16β-fluoro compounds.

*Example 28.—Isomerization of 16-fluoro compounds*

A mixture of 0.5 g. of 16β-fluoro-3-ethylenedioxy-androst-5-en-17-one and an equivalent amount of sodium methoxide in 20 ml. of methanol is refluxed for one hour. The mixture is cooled, neutralized with acetic acid, concentrated at reduced pressure and diluted with 10 ml. of water. The aqueous mixture is extracted with ethyl acetate and the organic layer evaporated. The residue is taken up in benzene, dried over anhydrous magnesium sulfate, filtered and the desired product recovered by chromatography of the filtrate over basic alumina with 1:1 ether-petroleum ether.

The procedure is also utilized to isomerize 16β-fluoro-3-ethylenedioxy-estr-5(6)-en-17-one and the corresponding estr-5(10)-en-17-one.

*Example 29.—Substitution of halogenated side chain*

The procedures of Examples 1, 2 and 3 are repeated with the appropriate starting compound prepared in accordance with Examples 26 and 27 to prepare the following compounds:

16α-fluoro-17α-chloroethynyl-3-ethylenedioxy-androst-5-en-17β-ol;
16α-fluoro-17β-chloroethynyl-3-ethylenedioxy-androst-5-en-17α-ol;
16α-fluoro-17α-bromoethynyl-3-ethylenedioxy-androst-5-en-17β-ol;
16α-fluoro-17β-bromoethynyl-3-ethylenedioxy-androst-5-en-17α-ol;
16α-fluoro-17α-trifluorovinyl-3-ethylenedioxy-androst-5-en-17β-ol;
16α-fluoro-17β-trifluorovinyl-3-ethylenedioxy-androst-5-en-17α-ol;
16α-fluoro-17α-trifluoropropynyl-3-ethylenedioxy-androst-5-en-17β-ol;
16α-fluoro-17β-trifluoropropynyl-3-ethylenedioxy-androst-5-en-17α-ol;
16α-fluoro-17α-chloroethynyl-3-ethylenedioxy-estr-5(6)-en-17β-ol;
16α-fluoro-17β-chloroethynyl-3-ethylenedioxy-estr-5(6)-en-17α-ol;
16α-fluoro-17α-bromoethynyl-3-ethylenedioxy-estr-5(6)-en-17β-ol;
16α-fluoro-17β-bromoethynyl-3-ethylenedioxy-estr-5(6)-en-17α-ol;
16α-fluoro-17α-trifluorovinyl-3-ethylenedioxy-estr-5(6)-en-17β-ol;
16α-fluoro-17β-trifluorovinyl-3-ethylenedioxy-estr-5(6)-en-17α-ol;
16α-fluoro-17α-trifluoropropynyl-3-ethylenedioxy-estr-5(6)-en-17β-ol;
16α-fluoro-17β-trifluoropropynyl-3-ethylenedioxy-estr-5(6)-en-17α-ol;
16α-fluoro-17α-chloroethynyl-3-ethylenedioxy-estr-5(10)-en-17β-ol;
16α-fluoro-17β-chloroethynyl-3-ethylenedioxy-estr-5(10)-en-17α-ol;
16α-fluoro-17α-bromoethynyl-3-ethylenedioxy-estr-5(10)-en-17β-ol;
16α-fluoro-17β-bromoethynyl-3-ethylenedioxy-estr-5(10)-en-17α-ol;
16α-fluoro-17α-trifluorovinyl-3-ethylenedioxy-estr-5(10)-en-17β-ol;
16α-fluoro-17β-trifluorovinyl-3-ethylenedioxy-estr-5(10)-en-17α-ol;
16α-fluoro-17α-trifluoropropynyl-3-ethylenedioxy-estr-5(10)-en-17β-ol;
16α-fluoro-17β-trifluoropropynyl-3-ethylenedioxy-estr-5(10)-en-17α-ol.

*Example 30.—16α-fluoro-17α-chloroethynyl-17β-hydroxy-androst-4-en-3-one*

To a stirred solution of 0.5 g. of 16α-fluoro-17α-chloroethynyl-3-ethylenedioxy-androst-5-en-17β-ol in 25 ml. of methanol is added 2 ml. of concentrated hydrochloric acid and 1.3 ml. of water. The mixture is stirred at room temperature for 3 hours and the methanol removed at reduced pressure. The residue is taken up in 150 ml. of ether, washed with water until the washings are neutral, dried over anhydrous sodium sulfate, filtered and the filtrate evaporated at reduced pressure to leave the desired product as a residue.

This procedure is utilized to prepare the identical compounds prepared in accordance with the procedure of Example 5. The 3-oxo-estr-4-enes are prepared from both estr-5(6)-enes and the corresponding 5(10)- compounds or from mixtures of these isomers.

What is claimed is:
1. A compound selected from the group which consists of 16α-fluoro-17-hydroxy-androst-4-en-3-one substituted at the 17-position with an unsaturated halogenated hydrocarbon side chain selected from the group consisting of trihalovinyl, trihalopropynyl and haloethynyl.
2. A compound selected from the group which consists of 16α-fluoro-17-hydroxy-estr-4-en-3-one substituted at the 17-position with an unsaturated halogenated hydrocarbon side chain selected from the group consisting of trihalovinyl, trihalopropynyl and haloethynyl.
3. A compound selected from the group which consists of 6,16α-difluoro-17-hydroxy-androst-4-en-3-one substituted at the 17-position with an unsaturated halogenated hydrocarbon side chain selected from the group consisting of trihalovinyl, trihalopropynyl and haloethynyl.
4. A compound selected from the group which consists of 6,16α-difluoro-17-hydroxy-estr-4-en-3-one substituted at the 17-position with an unsaturated halogenated hydrocarbon side chain selected from the group consisting of trihalovinyl, trihalopropynyl and haloethynyl.
5. A compound selected from the group which consists of 6-chloro-16α-fluoro-17-hydroxy-androst-4-en-3-one substituted at the 17-position with an unsaturated halogenated hydrocarbon side chain selected from the group consisting of trihalovinyl, trihalopropynyl and haloethynyl.
6. A compound selected from the group which consists of 6-chloro-16α-fluoro-17-hydroxy-estr-4-en-3-one substituted at the 17-position with an unsaturated halogenated hydrocarbon side chain selected from the group consisting of trihalovinyl, trihalopropynyl and haloethynyl.
7. 6α,16α-difluoro-17α-chloroethynyl-17β-hydroxy-androst-4-en-3-one.
8. 6α,16α-difluoro-17α-chloroethynyl-17β-hydroxy-estr-4-en-3-one.
9. 6α,16α-difluoro-17α-trifluorovinyl-17β-hydroxy-androst-4-en-3-one.
10. A compound selected from the group which consists of 16α-fluoro-androst-4-ene-3β,17-diol and mono- and diacyl lower hydrocarbon carboxylic esters thereof substituted at the 17-position with an unsaturated halogenated hydrocarbon side chain selected from the group consisting of trihalovinyl, trihalopropynyl and haloethynyl.
11. A compound selected from the group which consists of 16α-fluoro-estr-4-ene-3β,17-diol and mono- and diacyl lower hydrocarbon carboxylic esters thereof substituted at the 17-position with an unsaturated halogenated hydrocarbon side chain selected from the group consisting of trihalovinyl, trihalopropynyl and haloethynyl.
12. A compound selected from the group which consists of 6,16α-difluoro-androst-4-ene-3β,17-diol and mono- and diacyl lower hydrocarbon carboxylic esters thereof substituted at the 17-position with an unsaturated halogenated hydrocarbon side chain selected from the group consisting of trihalovinyl, trihalopropynyl and haloethynyl.

13. A compound selected from the group which consists of 6, 16α-difluoro-estr-4-ene-3β,17-diol and mono- and diacyl lower hydrocarbon carboxylic esters thereof substituted at the 17-position with an unsaturated halogenated hydrocarbon side chain selected from the group consisting of trihalovinyl, trihalopropynyl and haloethynyl.

14. A compound selected from the group which consists of 6-chloro-16α-fluoro-androst-4-ene-3β,17-diol and mono- and diacyl lower hydrocarbon carboxylic esters thereof substituted at the 17-position with an unsaturated halogenated hydrocarbon side chain selected from the group consisting of trihalovinyl, trihalopropynyl and haloethynyl.

15. A compound selected from the group which consists of 6-chloro-16α-fluoro-estr-4-ene-3β,17-diol and mono- and diacyl lower hydrocarbon carboxylic esters thereof substituted at the 17-position with an unsaturated halogenated hydrocarbon side chain selected from the group consisting of trihalovinyl, trihalopropynyl and haloethynyl.

16. 3β,17β - diacetoxy - 6α,16α - difluoro - 17α - chloroethynyl-androst-4-ene.

17. 3β,17β - diacetoxy - 6α,16α - difluoro - 17α - chloroethynyl-estr-4-ene.

18. 3β,17β - diacetoxy - 6α,16α - difluoro - 17α - trifluorovinyl-androst-4-ene.

19. 3β,17β - diacetoxy - 6α,16α - difluoro - 17α - trifluoropropynyl-estr-4-ene.

No references cited.

LEWIS GOTTS, *Primary Examiner.*

ELBERT L. ROBERTS, *Assistant Examiner.*